Dec. 17, 1968

J. P. ALESSANDRO 3,416,400

STRAP FOR LIMITING THE EXPANSION OF
THE BELLOWS OF AN ACCORDION

Filed April 12, 1965

INVENTOR
Joseph P. Alessandro
BY John Mahoney
ATTORNEY

United States Patent Office 3,416,400
Patented Dec. 17, 1968

3,416,400
STRAP FOR LIMITING THE EXPANSION OF THE BELLOWS OF AN ACCORDION
Joseph P. Alessandro, 4076 E. 123rd St., Cleveland, Ohio 44105
Filed Apr. 12, 1965, Ser. No. 447,406
7 Claims. (Cl. 84—376)

ABSTRACT OF THE DISCLOSURE

A strap for application to the heads or sections of an accordion for limiting the expansion of the bellows to simplify the teaching of the execution of the bellows shake.

---

My invention relates to a strap for application to the heads or sections of an accordion to limit the expansion of its bellows. It also relates to an accordion having oppositely disposed heads or sections and interconnecting bellows arranged therebetween, in combination with a strap for limiting the expansion of the bellows.

Accordions as now constructed are usually provided with means on its oppositely disposed heads or sections for holding the bellows in its contracted position when the accordion is not in use. For instance, the accordion may be provided with aligned first and second studs on the bass and keyboard sections, respectively, and with a third stud on the keyboard section which is arranged at an angle to the first stud thereon. A resilient link may also be provided, one end of which is swively mounted in a groove in the first stud on the keyboard side of the accordion and its opposite end has an opening therein to receive the rivet of an enlarged head, the opposite end of which rivet is connected to a dome-shaped clasp having a split ring therein which is snapped over the stud on the bass head or section to hold the bellows in its contracted position when the accordion is not in use. When it is desired to play the accordion, however, the link extending from the keyboard head is released from the stud on the bass head or section and the clasp on its free end is snapped over the third stud on the keyboard head or section.

In accordance with the present invention, when the link is released from the stud on the bass head to permit inward and outward expansion of the bellows, I have provided a strap which may be connected to the heads or sections on the opposite sides of the bellows to limit the outward movement of the bellows and which is adjustable so that the outward expansion of the bellows may be varied. My improved strap is designed for and is particularly adapted to be utilized in teaching pupils how to play the accordion and particularly to teach them to execute the bellows shake. The bellows shake consists in manipulating the oppositely disposed heads or sections of the accordion to provide rapid inward and outward expansion and contraction of the bellows and is somewhat difficult for a learner to execute because he has the tendency to expand the bellows too far.

In accordance with the present invention, I have provided means secured to the opposite heads or sections of an accordion to limit the outward expansion of the bellows which means is adjustable so that as the pupil progresses in his execution of the bellows shake, the connecting means between the opposite heads or sections of the accordion may be shortened. More particularly, I provide an adjustable strap having a mental tongue connected to one of its ends which has an aperture therein through which a rivet extends, one end of which is secured to and is supported by an enlarged head which rests upon the upper face of the tongue and the other end of which is secured to a dome-shaped clasp having a resilient split ring therein which may be snapped over a stud extending upwardly from the bass head or section of the accordion. The opposite end portion of the strap is secured to a ring which surrounds and at least partly engages the stud on the keyboard section and is held in place by the link, one end of which is swively mounted in a groove formed in the first stud on the keyboard section of the accordion. The opposite end of the link has an opening therein to receive a rivet having an enlarged head supported on the upper portion of the link and the other end of the rivet is secured to a dome-shaped clasp having a split resilient ring therein which snaps over the second stud on the bass head or section or over the third stud on the keyboard head or section.

It is therefore an object of my invention to provide an accordion consisting of a bass head or section and a keyboard head or section and bellows interconnected therebetween, in combination with improved means having oppositely disposed portions secured to each head or section to limit the expansion of the bellows.

Another object is to provide an accordion having a base section, a keyboard section, and bellows interconnected therebetween, in combination with a strap having one end secured to the bass section and its opposite end secured to the keyboard section and having means arranged intermediate its ends to adjust the length of that portion of the strap that extends between the sections.

A further object of my invention is to provide a strap for application between the heads or sections of an accordion with the bellows arranged therebetween to limit the expansion of the bellows which is particularly adapted for use by pupils studying to play the accordion and particularly those pupils who desire to execute the bellows shake which strap may be adjusted to limit the outward expansion of the bellows as the pupil advances in his technic in executing the bellows shake.

My invention will be better understood by reference to the accompanying drawings in which.

Figure 1:
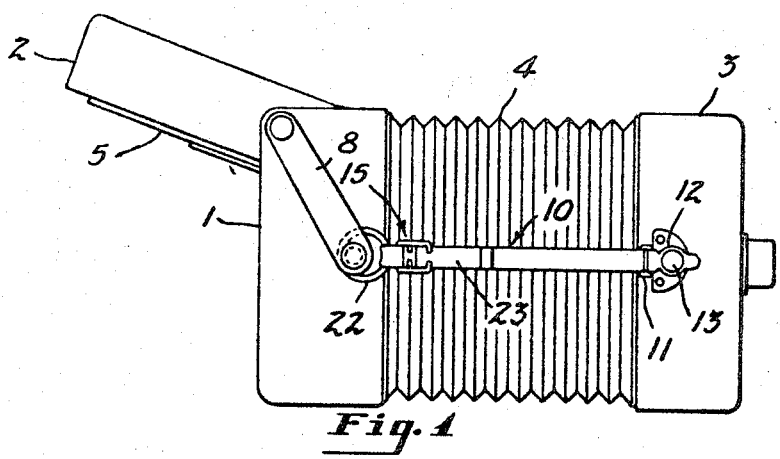
FIG. 1 is a side elevational view of an accordion showing a plan view of my improved strap.
Figure 2:
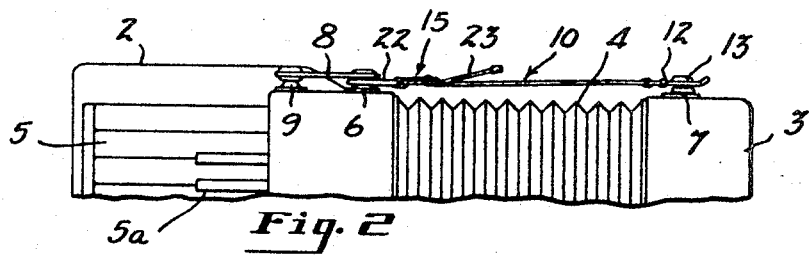
FIG. 2 is a plan view of the accordion showing a side elevational view of the strap.
Figure 3:
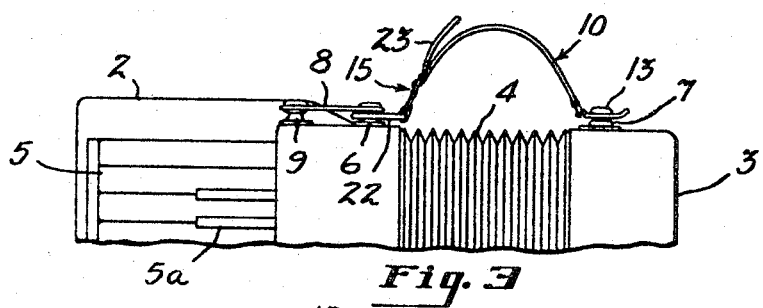
FIG. 3 is a view similar to FIG. 2 but showing the bellows in its contracted position.
Figure 4:
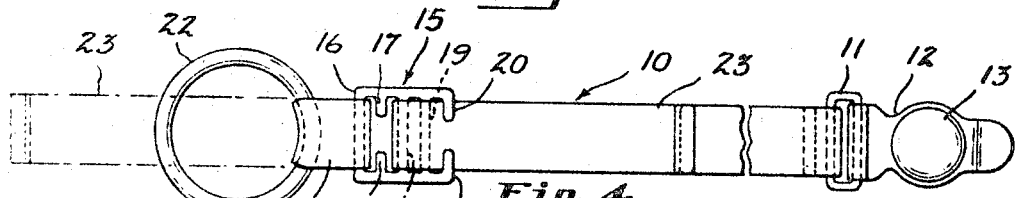
FIG. 4 is an enlarged plan view of my improved strap.

In the drawings an accordion of the usual type is illustrated having a keyboard head or section 1 which supports the usual keyboard 2 and a bass head or section 3, between which is interconnected the bellows 4. Accordions of the type illustrated are now well known in the art. In playing such instruments, the player not only presses down on the appropriate keys 5 on the keyboard but also manipulates the heads of the accordion to cause expansion and contraction of the bellows.

Figure 6:
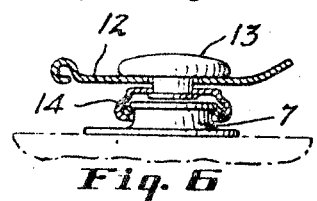
FIG. 6 is an enlarged detail view with parts in section showing the connection between the dome-shaped clasp depending from one end portion of the strap and the stud extending upwardly from the bass head of the accordion.

In teaching pupils to play the accordion, I have found that in certain manipulations, such as in executing the bellows shake, which requires short and quick bellow action, the pupil has the tendency to expand the bellows to too great an extent to obtain the best results. To overcome this tendency on the part of the pupil in attempting to execute the bellows shake, I provide a strap connected to the heads across the bellows which limits the outward movement of the oppositely disposed heads and which is preferably adjustable so that as the pupil advances in his playing technique, the portion of the strap extending between the bellows may be shortened to further limit the outward expansion of the bellows and while I do not desire to be limited to the material of which the strap is composed or the manner in which it is connected to the oppositely disposed sections or heads, advantage is preferably taken of means normally associated with the accordion for holding the bellows of the accordion in its contracted position when the instrument is not in use. As previously stated, in accordions now in use, aligned upwardly extending studs 6 and 7 are provided on the opposite heads and stud 6 is provided with a groove therein in which the inner portion of a link 8 is swively mounted. The opposite end of link 8 has an opening therein to receive a rivet secured to an enlarged head which rests on the upper face of link 8 and the opposite end of the rivet is connected to a dome-shaped clasp having a split resilient ring therein which is of sufficient size to snap over a third stud 9 which extends upwardly from the keyboard head of the accordion or over the stud 7 extending upward from the bass head 3. When the accordion is not in use, the clasp carried by the link 8 is released from the upwardly extending stud 9 and is applied to stud 7 extending upwardly from the head or section 3. The clasp connected to the rivet extending downwardly from link 8 is similar to the clasp shown in FIG. 6 and stud 9 is similar to stud 7.

When it is desired to teach a pupil to do the bellows shake, the clasp carried by link 8 is released from stud 7 and its opposite end is released from stud 6 and my improved strap is connected to the oppositely disposed heads across the bellows and while I do not desire to be limited to the material of which the strap is composed, the manner in which it is connected to the heads of the bellows, or the means by which it may be adjusted, as shown, the strap which is designated generally by the numeral 10 is formed of a strong flexible material, such as cotton or nylon, and one end extends through a metal loop 11 connected to a finger 12 having an enlarged central portion provided with an opening therein to receive a rivet, the upper portion of which is connected to a flat head 13 which rests upon the finger 12. The opposite end of the rivet is connected to a dome-shaped clasp 14 having a resilient split ring therein which is adapted to be sprung over the stud 7 and the opposite end portion of the strap 10 is connected to a clip designated generally by the numeral 15 which is preferably formed of a strong plastic material which is slightly resilient, such as a cellulose ester or ether, although if desired it may be formed of a slightly resilient metal. As shown, the clip includes an end strip 16, a pair of oppositely disposed lugs 17, spaced cross pieces 18 and 19, and a pair of end lugs 20. A strong cotton or nylon loop 21 extends around the end strip 16 of the clip and a ring 22 and has its opposite ends stitched together. When the clasp of link 8 is released from the stud 7 on head 3, and its opposite end is removed from stud 6 ring 22 is inserted over the stud 6 and one end of link 8 is inserted over the stud 6 and the clasp on the other end of link 8 is then sprung over the upwardly extending stud 9 on the keyboard head.

Figure 5:
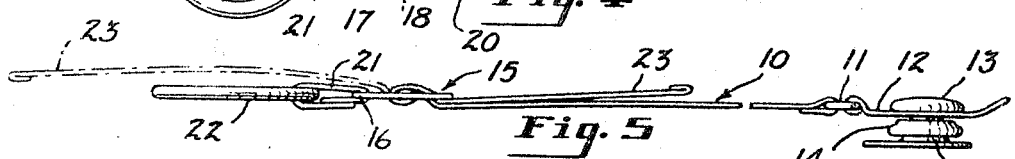
FIG. 5 is an enlarged side elevational view of the strap showing one of its ends connected to a stud extending upwardly from the bass section or head of the accordion.

When the strap 10 is thus applied to the heads or sections on the opposite sides of the bellows, the distance between the ring 22 and the loop 11 controls the distance the bellows may be expanded. To increase the distance, the bellows may be expanded, ring 22 may be pulled outwardly to move the clip 15 outwardly and to shorten the distance the bellows may be expanded, the free end of the strap may be pulled inwardly relative to the clip. When the desired length of the strap between ring 22 and loop 11 is determined, the end 23 of the strap may be reversed and inserted below lugs 20 as shown more particularly in FIG. 5 which locks the strap in place.

As previously stated, in teaching pupils to do the bellows shake, they are at first allowed some latitude in the distance the bellows may be expanded and as they advance in their technique, the portion of the strap extending between the oppositely disposed heads is gradually shortened to enable the bellows to be expanded only the desired distance necessary to provide the best results.

What is claimed is:

1. In combination with an accordion having oppositely disposed heads interconnected with bellows, a stud extending outwardly from each head which studs are in alignment with each other and each of said studs being movable with the respective head from which it extends during the contraction and expansion of the bellows, a strap extending across said bellows, said strap being sufficiently flexible to bend when said heads are moved inwardly toward each other to contract the bellows and the length of said strap between said studs being such that it limits the outward movement of said bellows when the bellows are expanded and contracted quickly to execute the bellows shake.

2. Apparatus as defined in claim 1 including means for adjusting the length of that portion of the strap extending between the studs on the oppositely disposed heads to vary the outward expansion of said bellows.

3. The combination of an accordion having oppositely disposed heads interconnected by bellows, an upwardly extending first stud on one head and an upwardly extending stud on the second head which studs are arranged in alignment with each other, a strap extending across said bellows and having one end portion connected to the first stud, a link having one end swively mounted on the second stud, a ring on another portion of the strap surrounding and having a portion engaging the second stud and being held in place by said link.

4. The combination as defined in claim 3 including means for adjusting the portion of the strap extending between the two heads to vary the outward expansion of the bellows.

5. In combination with an accordion having oppositely disposed first and second heads interconnected by bellows, an upwardly extending first stud on the first head and an upwardly extending second stud on the second head which studs are arranged in alignment with each other, a strap extending across the bellows and having a clasp on one end portion for engaging and interconnecting one end of the strap with the first stud and another portion of said strap having a ring thereon which surrounds and at least partly engages a portion of the second stud, a third stud extending upwardly from the second head, and a link having one end swively mounted on the second stud and having a resilient clasp on its opposite end for engaging the third stud to hold said ring in place.

6. The combination defined in claim 5 including means for adjusting the portion of the strap extending between the two heads to vary the distance the bellows may be expanded.

7. A flexible strap as defined in claim 5 including a clip on said strap through which said strap may be drawn in either direction and said clip also having inwardly extending studs at one end below which one end of the strap may be inserted for locking the strap against further contraction or expansion.

References Cited

UNITED STATES PATENTS

| | | | |
|---|---|---|---|
| 1,836,961 | 12/1931 | Geartner | 84—83 |
| 2,065,574 | 12/1936 | Galanti | 84—376 |
| 2,550,320 | 4/1951 | Yeager | 84—376 |
| 3,100,417 | 8/1963 | De John | 84—376 |

ROBERT S. WARD, JR., *Primary Examiner.*

S. A. WAL, *Assistant Examiner.*